(12) United States Patent
Thell

(10) Patent No.: US 12,252,378 B2
(45) Date of Patent: Mar. 18, 2025

(54) CABLE GUIDE FOR A HELICOPTER CABLE WINCH AND HELICOPTER COMPRISING A CABLE GUIDE

(71) Applicant: Rainer Thell, Vienna (AT)

(72) Inventor: Rainer Thell, Vienna (AT)

( * ) Notice: Subject to any disclaimer, the term of this patent is extended or adjusted under 35 U.S.C. 154(b) by 286 days.

(21) Appl. No.: 17/661,333

(22) Filed: Apr. 29, 2022

(65) Prior Publication Data

US 2023/0348059 A1    Nov. 2, 2023

(51) Int. Cl.
*B66D 1/36*    (2006.01)
*B64D 1/22*    (2006.01)

(52) U.S. Cl.
CPC ...... *B66D 1/36* (2013.01); *B64D 1/22* (2013.01)

(58) Field of Classification Search
CPC ...... B66D 1/36–38; B66D 3/046; B66D 5/06; B66D 5/16; B64D 1/22
See application file for complete search history.

(56) References Cited

U.S. PATENT DOCUMENTS

| | | | | |
|---|---|---|---|---|
| 2,738,939 A * | 3/1956 | Johnson | ............ | B64D 1/22 441/83 |
| 3,228,044 A * | 1/1966 | Mattenson | ............ | B63C 9/26 441/83 |
| 4,750,691 A * | 6/1988 | Hollrock | ............ | B64C 1/22 244/137.1 |
| 5,762,297 A * | 6/1998 | Ascherin | ............ | B66D 1/7431 244/137.4 |
| 7,347,411 B1 * | 3/2008 | Teel | ............ | B66D 3/046 254/405 |
| 8,567,710 B2 * | 10/2013 | Hayashi | ............ | B64C 25/52 244/17.11 |
| 2019/0263642 A1 * | 8/2019 | Hainsworth | ............ | B66D 1/36 |

FOREIGN PATENT DOCUMENTS

CH    275919 A *    6/1951    ............. B66D 3/046

* cited by examiner

*Primary Examiner* — Sang K Kim
*Assistant Examiner* — Nathaniel L Adams
(74) *Attorney, Agent, or Firm* — Workman Nydegger

(57) ABSTRACT

A cable guide for a helicopter cable winch. The cable guide includes a cable, a cable retainer and a boom connected to the cable retainer. The boom is connectable to a helicopter. The cable retainer lock a retainer lock, and in an operating state of the cable guide, the retainer lock is closed, so that the cable retainer surrounds the cable along a section of a cable length. In a resting state of the cable guide, the retainer lock is opened, so that the cable is removeable from the cable retainer.

17 Claims, 2 Drawing Sheets

CABLE GUIDE FOR A HELICOPTER CABLE WINCH AND HELICOPTER COMPRISING A CABLE GUIDE

BACKGROUND OF THE INVENTION

The present invention relates to a cable guide for a helicopter cable winch and helicopter comprising a cable guide.

Helicopters with cable winches are used to lower people from the helicopter, or to transport a person into the helicopter, without the helicopter having to land. The cable winches are usually installed to an outer hull of the helicopter, combined with a swivel arm.

During the operation of the cable winch, it is essential for the helicopter pilot to hover over a specific area without introducing any excessive movement into the cable. This is especially necessary when transporting one or more persons, who are hanging on one end of the cable. Although helicopter pilots are usually very skilled when performing this task, there is still a possibility that the cable can begin to swing and collide with components of the helicopter itself.

This problem is prevalent in rescue helicopters, which are used in mountainous regions. Due to unpredictable winds and weather conditions, the cable of the cable winch may start to swing during operation and collide for example with the skid of the helicopter. This leads to premature wear and can even damage the cable, which results in a severe risk to the person hanging on an end of the cable. In order to prevent this from occurring, a winch operator, who stands on the skid of the helicopter during the operation, usually uses his hand to manually guide the cable in order to stabilize it and to prevent any possible collisions with components of the helicopter. A disadvantage of this approach is that the necessary presence of the winch operator for performing this task leads to a reduced available load capacity and reduced cargo space of the helicopter during operation. Additionally, operating costs are increased not only by the resulting additional personnel costs, but also due to increased fuel consumption. Lastly the additional weight also leads to a reduction in the maximum flight altitude of the helicopter.

BRIEF SUMMARY OF THE INVENTION

The technical problem of the present invention is therefore to prevent any collision of the cable during operation of the cable winch with any part of the helicopter, increasing the operational capabilities and reducing the operating costs of the helicopter.

This problem is solved by the provision of a cable guide for a helicopter cable winch according to the subject matter of claim 1 and by a helicopter according to the subject matter of claim 9.

The cable guide for a helicopter cable winch comprising a cable according to the present invention comprises a cable retainer and a boom connected to the cable retainer. The boom is connectable to a helicopter. The cable retainer comprises a retainer lock, and in an operating state of the cable guide, the retainer lock is closed, so that the cable retainer surrounds the cable along a section of a cable length, and in a resting state of the cable guide, the retainer lock is opened, so that the cable is removeable from the cable retainer.

By employing the boom with the cable retainer connected to the boom, the cable can be guided by the cable retainer in the operating state of the cable guide. When the cable of the cable winch is retracted, the cable retainer is not needed and can therefore be removed from the cable retainer. In this way, the cable is always guided securely during operation of the cable winch, and can also be fully retracted, when the cable guide is in its resting state. Therefore, no additional winch operator is necessary to prevent a collision of the cable with the helicopter during operation.

According to a preferred embodiment of the present invention, the boom comprises a swivel joint. The swivel joint enables the boom with the cable retainer to be stowed away when the cable guide is not in use. Preferably the swivel joint also comprises a swivel lock. By using the swivel lock, the boom can be fixed in different positions. The cable guide may also comprise an actuating element connected to the swivel lock, which enables an easy operation of the swivel lock.

According to the preferred embodiment, the cable guide also comprises an actuating element connected to the retainer lock. By using the actuating element, the retainer lock can easily be opened and closed by an operator.

The swivel joint is preferably adapted to hold the cable retainer in an area of a helicopter skid in the operating state of the cable guide, and away from the helicopter skid in the resting state of the cable guide. Hereby, the cable guide is unobtrusive during usual operation of the helicopter and can be employed when needed. The actuating elements are also preferably located on the boom and/or the cable retainer, where they can easily be accessed from outside the helicopter.

In order to prevent snagging of the cable on the cable guide during operation, the cable retainer preferably has a funnel shape.

The helicopter according to the invention comprises the cable guide, and preferably also a helicopter cable winch with a cable, wherein in an unwound state of the cable, the cable runs through the cable retainer, when the cable guide is in the operating state.

According to a preferred embodiment of the helicopter according to the invention, the boom is connected to a footboard of the helicopter. Alternatively, the boom may also be connected to a skid or a skid carrier of the helicopter. All these options provide a sturdy mounting position of the boom.

The helicopter cable winch may also comprise a remote control which is preferably designed as a wireless remote control. The remote control enables a person to control the operation of the helicopter cable winch from the end of the cable.

BRIEF DESCRIPTION OF THE DRAWINGS

The cable guide according to the invention and the helicopter according to the invention, as well as preferred and alternative embodiments will be described hereinbelow with reference to the figures.

DETAILED DESCRIPTION OF THE PREFERRED EMBODIMENTS

Figure 1:
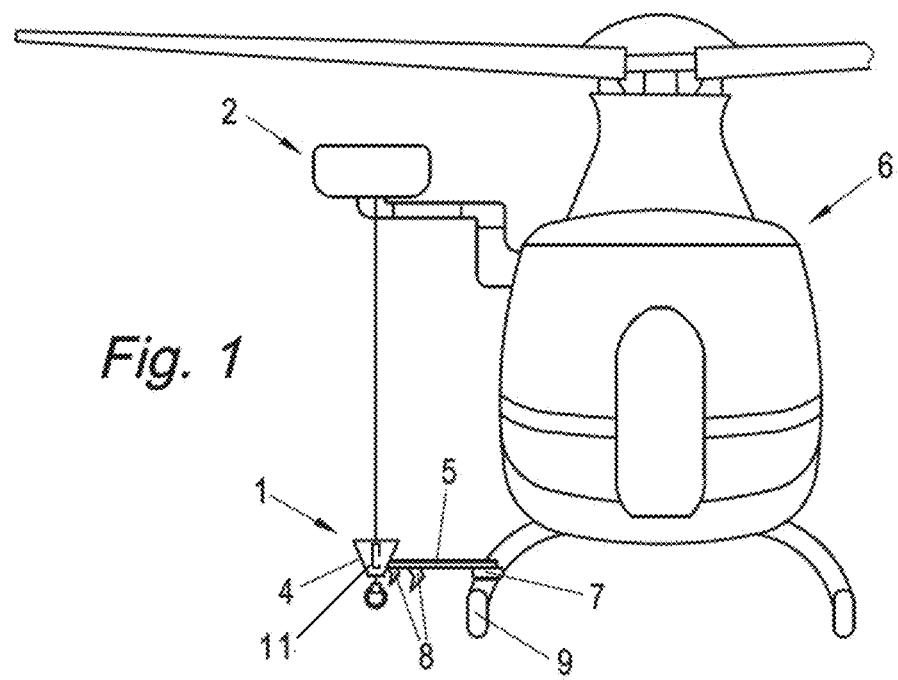
FIG. 1 shows a helicopter fitted with a cable guide according to the invention, wherein the cable guide is in an operating state.
Figure 2:
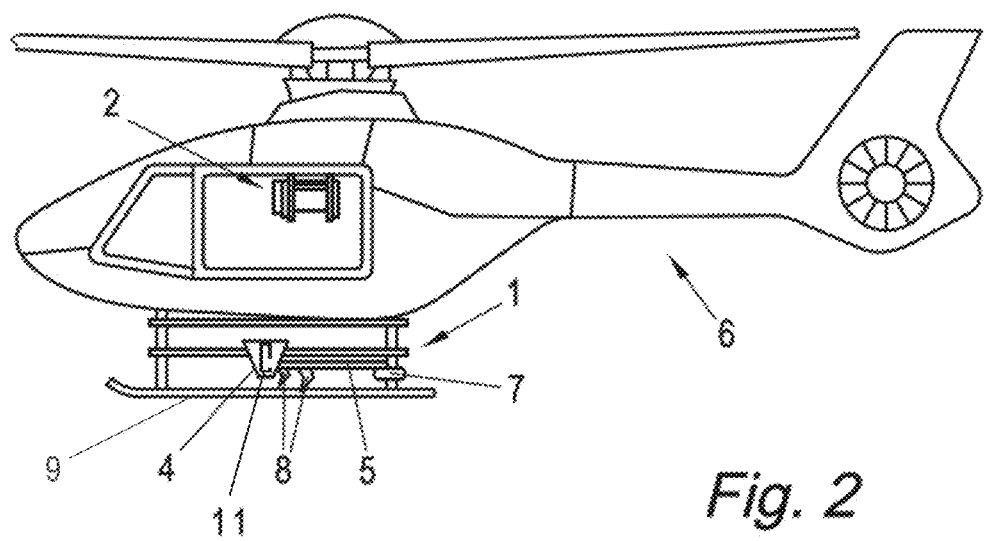
FIG. 2 shows the helicopter with the cable guide, wherein the cable guide is in a resting state.

FIG. 1 shows a cable guide 1 according to the invention for a helicopter cable winch 2 comprising a cable 3 in an operating state. The cable winch 2 can also be seen in FIG. 2 and FIG. 3, in which the cable guide 1 is shown in a resting state. The cable guide 1 comprises a cable retainer 4 and a boom 5 connected to the cable retainer 4, wherein the boom 5 is connectable to a helicopter 6. The cable retainer 4 comprises a retainer lock 11, and in the operating state of the cable guide 1, the retainer lock 11 is closed, so that the cable retainer 4 surrounds the cable along a section of a cable length, and in the resting state of the cable guide 1, the retainer lock is opened, so that the cable 3 is removeable from the cable retainer 4. In FIG. 2, the cable guide 1 is shown in the resting state according to a preferred embodiment. The retainer lock 11 may for example be a tension lock or a clamp fastener. By providing a cable retainer 4, which can be opened to insert or remove the cable 3 from the cable retainer 4, and which is fixed to the boom, the cable 3 can be held at a predetermined position away from the helicopter 6, so that it does not collide with for example a skid or the landing gear of the helicopter 6, thereby possibly causing damage or wear to the helicopter 6 or the cable 3 itself.

The cable guide 1 according to the invention is preferably used on rescue helicopters 6, for example in mountainous regions to rescue people which have suffered injuries, and who cannot be recovered by conventional methods due to the difficult terrain. Such rescue helicopters 6 operate by lowering a mountain rescuer via the cable 3 so that the mountain rescuer reaches the injured person. In order to retrieve the injured person, the mountain rescuer fixes the person to the cable 3 by means of a harness. After that, the mountain rescuer is pulled up via the cable 3 together with the injured person. According to the prior art, in order to stabilize the cable 3 and prevent any collisions of the cable 3 with components of the helicopter 6, a winch operator, who remains in the helicopter during this procedure, grabs the cable 3 and stabilizes it by hand. The cable guide 1 according to the invention replaces this function of the winch operator, by providing additional stabilization to the cable 3 during rescue operations. In order to operate the helicopter cable winch 2, the mountain rescuer may be provided with a remote control for the helicopter cable winch 2, in order to control the descend and/or ascend of the mountain rescuer and the injured person, if the person has already been recovered by the mountain rescuer. This remote control is therefore preferably designed as a wireless remote control. The remote control enables the mountain rescuer himself to operate the helicopter cable winch 2 and to preferably regulate the speed in which the cable 3 is wound or unwound by the helicopter cable winch 2. By using a remote control, no additional operator is required to operate the helicopter cable winch 2. The remote control can for example be provided with a retainer to fix the remote control to the chest of the mountain rescuer, making it easily accessible during rescue operations to the mountain rescuer.

Figure 3:
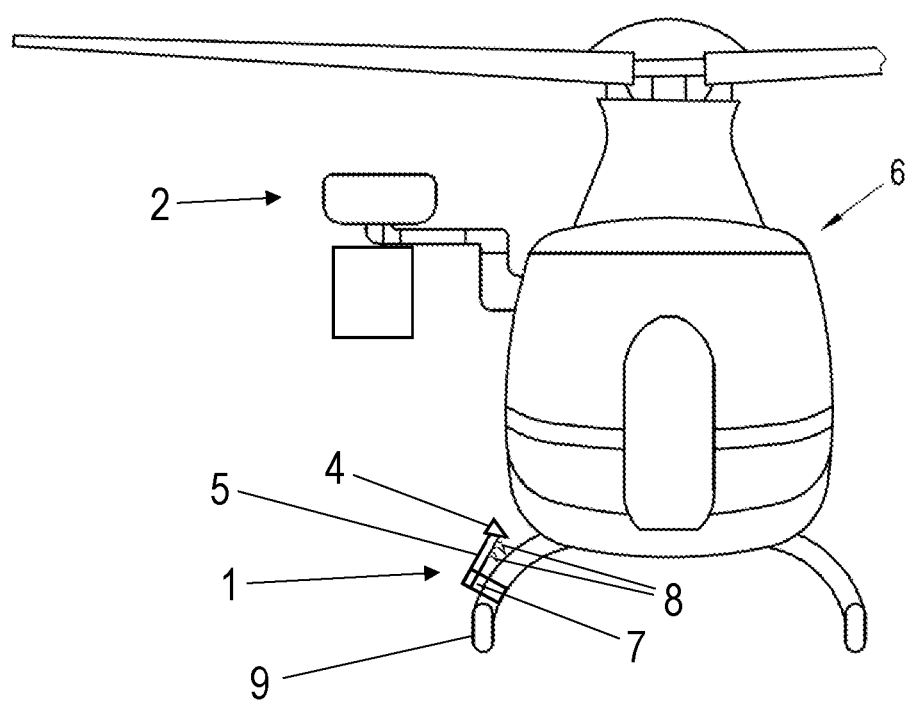
FIG. 3 shows the helicopter with the cable guide according to an alternative embodiment, in the resting state.

According to a preferred embodiment of the cable guide 1, the boom comprises a swivel joint 7, which may also comprise a swivel lock. The swivel joint 7 may be used to stow the cable guide away when it is not in use, preventing any possible interference with the usual operation of the helicopter 6. This can be seen in FIG. 2, in which the cable guide 1 is shown in the resting state, in which the boom 5 is tilted, so that it is oriented essentially parallel with a length of the helicopter 6. Alternatively, the boom 5 can be tilted upwards, as seen in FIG. 3. By using the swivel lock, the cable guide can be locked in either position. The cable guide 1 may also comprise an actuating element 8 connected to the retainer lock 11 and/or an actuating element 8 connected to the swivel lock. These actuating elements 8 can be designed as separate elements as shown in the figures, or as a combined actuating element 8, which simultaneously actuates the swivel lock and the retainer lock 11. The actuating elements 8 can also be located on the boom 5 and/or cable retainer 4. In this way, the actuating elements 8 are easily accessible by the mountain rescuer from outside of the helicopter 6, when hanging on the cable 3.

As shown in FIG. 1, the swivel joint 7 is preferably adapted to hold the cable retainer 4 in an area of a helicopter skid 9 in the operating state of the cable guide 1, and away from the helicopter skid 9 in the resting state of the cable guide 1. This reduces the risk that the cable 3 collides with the skid 9 during operation.

The cable retainer 4 preferably has a funnel shape, as shown in the figures. The funnel shape provides an easy way of guiding the cable 3 through the cable retainer 4, and simultaneously reduces the risk of snagging the cable 3. An inside area of the funnel shape may also be lined with a friction reducing insert, which may be a plastic material. This friction reducing insert can be permanently fixed to the cable retainer or may be replaceable.

The helicopter 6 according to the invention comprising the cable guide 1 according to the invention. Furthermore, the helicopter 6 according to the invention comprises the helicopter cable winch 2 with the cable 3, which helicopter cable winch 2 may also comprise a preferably wireless remote control. In an unwound state of the cable 3, as seen in FIG. 1, the cable 3 runs through the cable retainer 4, when the cable guide 1 is in the operating state. The boom 5 may be connected to a footboard, a skid 9 or a skid carrier of the helicopter 6.

I claim:

1. A cable guide for a helicopter cable winch comprising a cable, wherein the cable guide comprises:
    a cable retainer and a boom connected to the cable retainer, wherein the boom is connectable to a helicopter,
    wherein the cable retainer comprises a retainer lock,
    wherein the cable guide has an operating state in which the cable retainer tapers from an entry side to an exit side of the cable retainer, the cable retainer being configured to surround the cable along a section of a cable length extending from the entry side to the exit side of the cable retainer and guide the cable in the operating state of the cable guide, the cable guide being held at a first predetermined position away from the helicopter, and
    wherein the cable guide has a resting state in which the cable is removed from the cable retainer and the cable retainer is at a second predetermined position away from the helicopter, the second predetermined position being closer to the helicopter than the first predetermined position.

2. The cable guide according to claim 1, wherein the boom comprises a swivel joint.

3. The cable guide according to claim 2, wherein the boom is configured to move about the swivel joint to tilt the boom upwardly in relation to or position the boom parallel to a skid of the helicopter.

4. The cable guide according to claim 2, wherein the swivel joint is adapted to hold the cable retainer in an area of a helicopter skid in the operating state of the cable guide, and away from the helicopter skid in the resting state of the cable guide.

5. The cable guide according to claim 1, wherein the cable retainer has a funnel shape.

6. A helicopter comprising a cable guide according claim 1.

7. The helicopter according to claim 6, wherein the helicopter comprises a helicopter cable winch with a cable, and in an unwound state of the cable, the cable runs through the cable retainer, when the cable guide is in the operating state.

8. The helicopter according to claim 7, wherein the cable retainer is disposed vertically below the cable winch.

9. The helicopter according to claim 7, wherein the boom is mounted to a skid carrier by a swivel joint configured to tilt the boom upwardly in relation to the skid of the helicopter.

10. The helicopter according to claim 7, wherein the boom is mounted to a skid carrier by a swivel joint configured to position the boom parallel to a skid of the helicopter.

11. The helicopter according to claim 6, wherein the boom is connected to a footboard of the helicopter.

12. The helicopter according to claim 6, wherein the boom is connected to a skid of the helicopter.

13. The helicopter according to claim 6, wherein the boom is connected to a skid carrier of the helicopter.

14. The helicopter according to claim 6, wherein the helicopter cable winch comprises a remote control which is designed as a wireless remote control.

15. A cable guide for a helicopter cable winch comprising a cable, wherein the cable guide comprises:
    a tiltable boom selectively tiltable in relation to a footboard, skid or skid carrier of a helicopter;
    a cable retainer connected to an end of the boom, the cable retainer comprising a retainer lock and in an operating state of the cable guide the cable retainer being configured to receive the cable at a helicopter cable winch side of the cable retainer and guide the cable to an opposite side of the cable retainer vertically below the helicopter cable winch side, the cable retainer tapering from helicopter cable winch side to the opposite side,
    wherein, the cable guide has (i) an operating state in which the cable retainer surrounds the cable along a section of a cable length extending from an entry side to an exit side of the cable retainer and guides the cable in the operating state of the cable guide, the cable guide being held at a predetermined position away from the helicopter, and (ii) a resting state in which the cable is removed from the cable retainer.

16. The cable guide of claim 15, wherein a position of the cable retainer is selectively movable through tiltable movement of the boom.

17. The cable guide of claim 16, further comprising a swivel joint connecting the boom to the helicopter.

* * * * *